United States Patent [19]
Fuchs

[11] Patent Number: 4,644,409
[45] Date of Patent: Feb. 17, 1987

[54] DOCUMENT RESOLUTION-ADAPTION METHOD AND APPARATUS

[75] Inventor: Peter M. Fuchs, Sunnyvale, Calif.

[73] Assignee: Advanced Micro Devices, Inc., Sunnyvale, Calif.

[21] Appl. No.: 705,600

[22] Filed: Feb. 26, 1985

[51] Int. Cl.⁴ .............................................. H04N 1/00
[52] U.S. Cl. .................... 358/256; 358/257; 358/280; 358/287
[58] Field of Search ............... 358/140, 256, 257, 280, 358/287, 903; 382/47, 54

[56] References Cited

U.S. PATENT DOCUMENTS

| | | | |
|---|---|---|---|
| 3,751,582 | 8/1973 | Wernikoff et al. | 358/256 |
| 3,914,538 | 10/1975 | Perreault et al. | 358/256 |
| 4,000,371 | 12/1976 | Ogawa | 358/256 |
| 4,471,381 | 9/1984 | Kasuga et al. | 358/140 |
| 4,533,958 | 8/1985 | Herget | 358/280 |
| 4,575,769 | 3/1986 | Arnoldi | 358/280 |

Primary Examiner—James J. Groody
Assistant Examiner—Edward L. Coles
Attorney, Agent, or Firm—Patrick T. King; Kenneth B. Salomon

[57] ABSTRACT

A method and device for adapting the scanning-resolution used by a first document-scanning device acting as an input device to a scanning-resolution used by a second such device acting as an output device so that the signals generated by the first device can be processed by the second device. User-selectable input and output scanning resolutions determine an output/input resolution ratio which specifies replication of scan-lines received from the input device and transmittal and skipping of selected ones of these scan-lines to the output device. Replication and skipping of scan-lines take place concurrently so that only a single scan-line need be accessed and stored during the adaption resolution process. The method and apparatus of the present invention permit connection of an input scanning device to an output scanning device without restriction as to the scanning-resolutions used internally within the devices.

6 Claims, 4 Drawing Figures

4,644,409

DOCUMENT RESOLUTION-ADAPTION METHOD AND APPARATUS

FIELD OF THE INVENTION

This invention relates to transmission of documents by line-scanning techniques and, in particular, to method and apparatus for adapting the resolution used within one document-scanning device to that of another such device so that the output of the first device can be processed by the second device.

BACKGROUND OF THE INVENTION

In the transmission of documents, it is oftentimes necessary to adapt the resolution used within one type of line-scanning device, used as an "input" device such as a 480 lines-per-inch (l.p.i.) Teletex, to that used within another such device, used as an "output" device, such as a 300 l.p.i. facsimile terminal, so that the output representing a document generated by the Teletex may be transmitted via the facsimile terminal to another such terminal remote from the first. As another example, it may be necessary to adapt a bit-mapped resolution to a different resolution used by a cathode ray tube (crt) display. Generally, it is desirable to be able to obtain any given output to input resolution ratio.

Present resolution-adaption techniques do not permit such generalized output-to-input resolution adaption. This is because they process a document represented by a fixed number of scan-lines having a given input resolution, by, for each scan-line, either making a duplicate copy of a line or skipping the scan-line, depending on whether the output resolution is higher, or lower, respectively, than the input resolution. This technique proves useful only for a limited number of ouput-to-input resolution ratios. For example, by skipping every third line an output resolution of 300 l.p.i. can be obtained from an input resolution of 450 l.p.i., or by duplicating every third scan-line of the document twice an input resolution of 300 l.p.i. can be adapted to an output resolution of 400 l.p.i. However, adaption of the resolutions of the Teletex to the facsimile terminal, described above, cannot be obtained by present techniques, because a resolution of 480 l.p.i. cannot be obtained from a resolution of 300 l.p.i. simply by skipping every pth line nor can 300 l.p.i. be obtained from 480 l.p.i. by simply duplicating every qth line, regardless of the value of p or q.

In addition, some present adaption techniques require that each scan-line from the input device be stored as an intermediate sequence, even though only certain of these scan-lines result in scan-lines in the output. This imposes a line storage requirement that is larger than necessary.

SUMMARY OF THE INVENTION

The resolution adaption method according to the present invention permits adaption of any input resolution to any output resolution, thereby permitting use of any "input" document-scanning device with any "output" document-scanning device. Furthermore, replication and skipping of scan-lines takes place simultaneously so that an intermediate sequence of scan-lines need not be stored, thereby imposing only a minimal storage requirement.

The user specifies, without restriction, an input resolution and an output resolution which defines an output/input resolution ratio x/y. For instance, to adapt a 480 l.p.i. input resolution to a 300 l.p.i. output resolution, an output/input resolution ratio of 300/480 or 5/8 is defined.

The method calls for accessing the scan-line from the input device. This line is replicated (x−1) times to obtain a resolution x times as great as the input resolution. The first such scan-line becomes the first scan line transmitted to the output device. The next (y−1) lines of the replicated input scan-lines are skipped before another scan-line from the replicated input is transmitted to the output device. This process is repeated until all the scan-lines generated by the input document-scanning device for a particular document have been replicated and the corresponding output scan-lines have been generated.

Continuing with the example, each input scan-line from the Teletex using a 480 l.p.i. resolution would be replicated four times, resulting in a total of five scan-lines for each input scan-line. Starting with the first such scan-line, the first, ninth, seventeenth, etc. scan-lines from this replicated input would be transmitted to the output device to represent the document using the 300 l.p.i. resolution of the facsimile device.

The method does not actually call for replicating the input scan-lines, but for storing an input scan-line on a buffer, and performing the replication and skipping functions by counters.

Apparatus is disclosed which embodies the resolution-adaption method of the present invention using commonly-available components.

DETAILED DESCRIPTION OF THE PREFERRED EMBODIMENT

The resolution adaption method according to the present invention provides a way of interconnecting two document scanning devices using different resolutions. The method is able to adapt any scanning resolution used internally within a device acting as the "input" to any scanning resolution used within a second device acting as the "output", for example, it can provide an interface between two different facsimile resolutions, a facsimile and a teletex, a bit-map and any cathode ray tube (crt) resolution, or two different crt resolutions.

Figure 1:
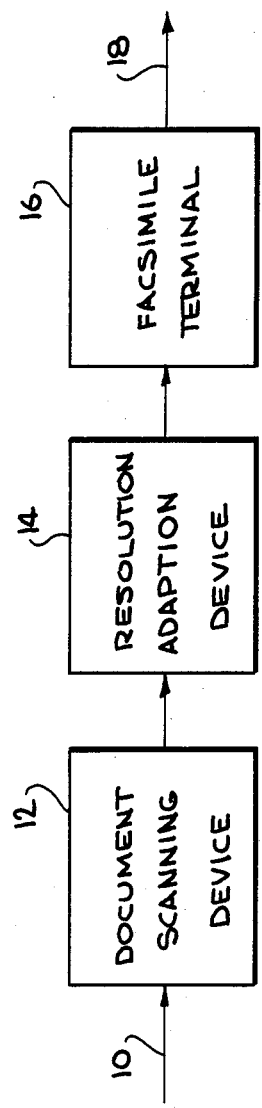
FIG. 1 is an illustration of an application of a resolution-adaption device constructed according to the teachings of the present invention.

As an illustrative embodiment, reference should be had to FIG. 1. A document 10 is shown therein being optically scanned line-by-line by a document scanning device 12 using a resolution of 480 lines per inch (l.p.i.). The resulting electrical signals containing scanning information derived from the document 10 are conveyed to a resolution adaption device 14 operating according to the teachings of the instant invention. The device 14 translates the 480 l.p.i. resolution of the "input" device 12 into a 300 l.p.i. resolution used by an "output" device 16, here a facsimile terminal which generates signals suitable for transmission of the document 10 over telephone lines 18.

Figure 2:
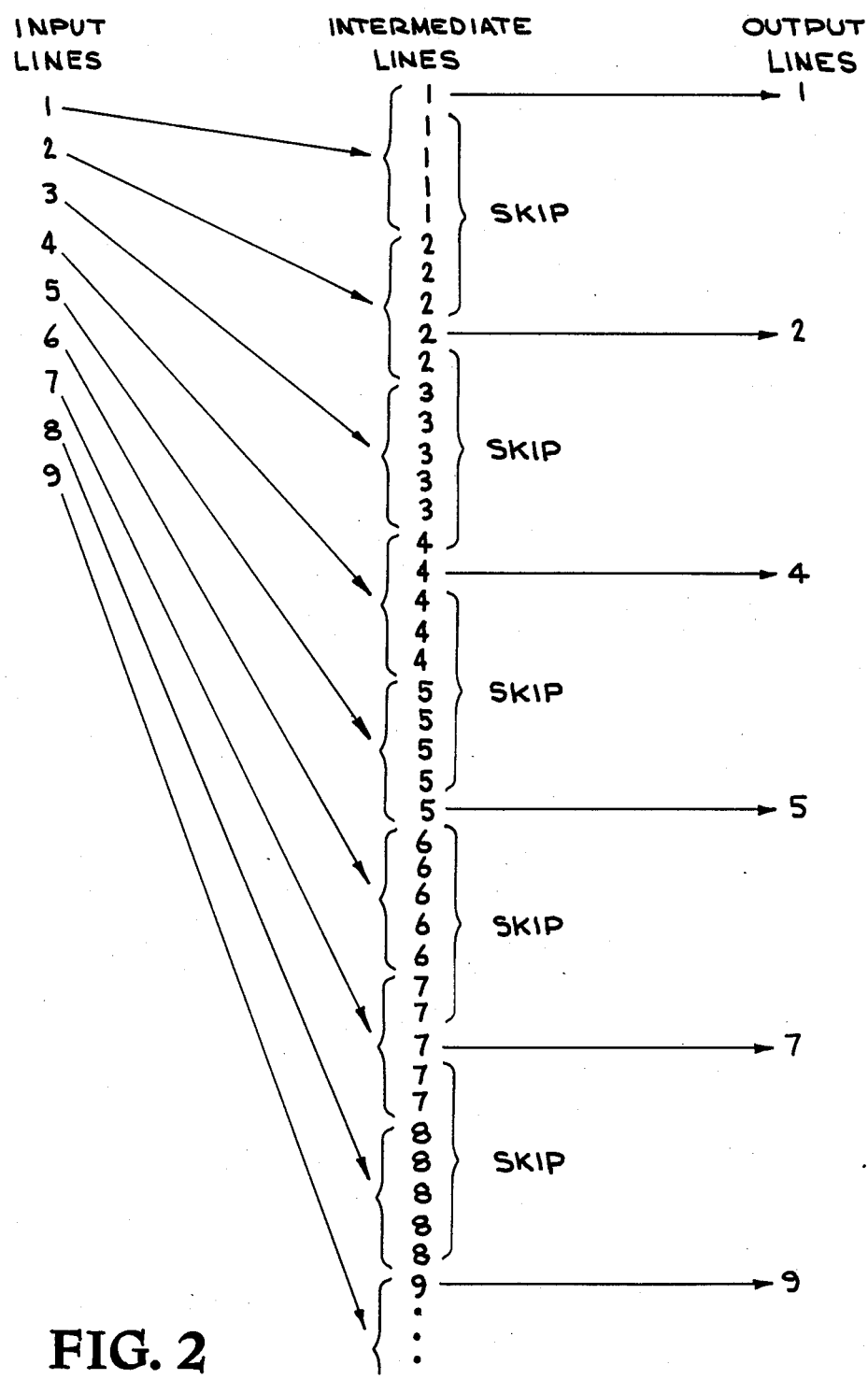
FIG. 2 diagramatically illustrates the operation of the resolution adaption method of the present invention.

Referring to FIG. 2 of the drawings, the resolution adaption method of the present invention is diagramatically illustrated by way of an example. Adaption of the document scanning device 12 having a resolution of 480 lines per inch (l.p.i.) ("input resolution" of 480 l.p.i.) to the facsimile terminal 16 with a 300 l.p.i. resolution ("output resolution" of 300 l.p.i.) is shown. The output/input resolution ratio is accordingly $300/480 = 5/8$, resulting in a dividend $x = 5$ and a divisor $y = 8$.

As shown in the lefthand column of FIG. 2, a first, line "1", from the document scanning device 12 is accessed, this "input" line is replicated $(x-1) = 4$ times to obtain the first five intermediate lines shown as five "1"'s in the middle column of FIG. 2. A second input line "2" is replicated $(x-1) = 4$ times to obtain the second five intermediate lines shown as five "2"'s in the middle column of FIG. 2. Since the number of intermediate lines generated, ten, exceeds the value of the divisor $y = 8$, the first line of the first ten generated is used to form the first line "1" of the "output", as shown in the righthand column of FIG. 2.

The next $(y-1) = 7$ lines are skipped, as shown in the middle column of FIG. 2 and the ninth intermediate line generated, i.e., the second line "2" from the document-scanning device 12 is used to form the second line of the output, as shown in the righthand column of FIG. 2.

Lines "3" and "4" are replicated $(x-1) = 4$ times to obtain the next ten intermediate lines shown as five "3"'s followed by five "4"'s in the middle column of FIG. 2. The $(y-1) = 7$ intermediate lines following the "2" used to form the second output line are skipped and the second "4" generated as an intermediate line is used to form the third line of the output. Accordingly, the fourth line from the document scanning device becomes the third facsimile line.

The procedure illustrated in FIG. 2 is repeated until all input lines of the document 10 as generated by the document-scanning device 12 have been processed, and the resulting output lines generated by resolution adaption device 14 are conveyed to the facsimile terminal 16 for transmission via telephone lines 18 or until the number of lines generated by resolution adaption device 14 equals the document-size utilized by facsimile terminal 16.

Figure 3:
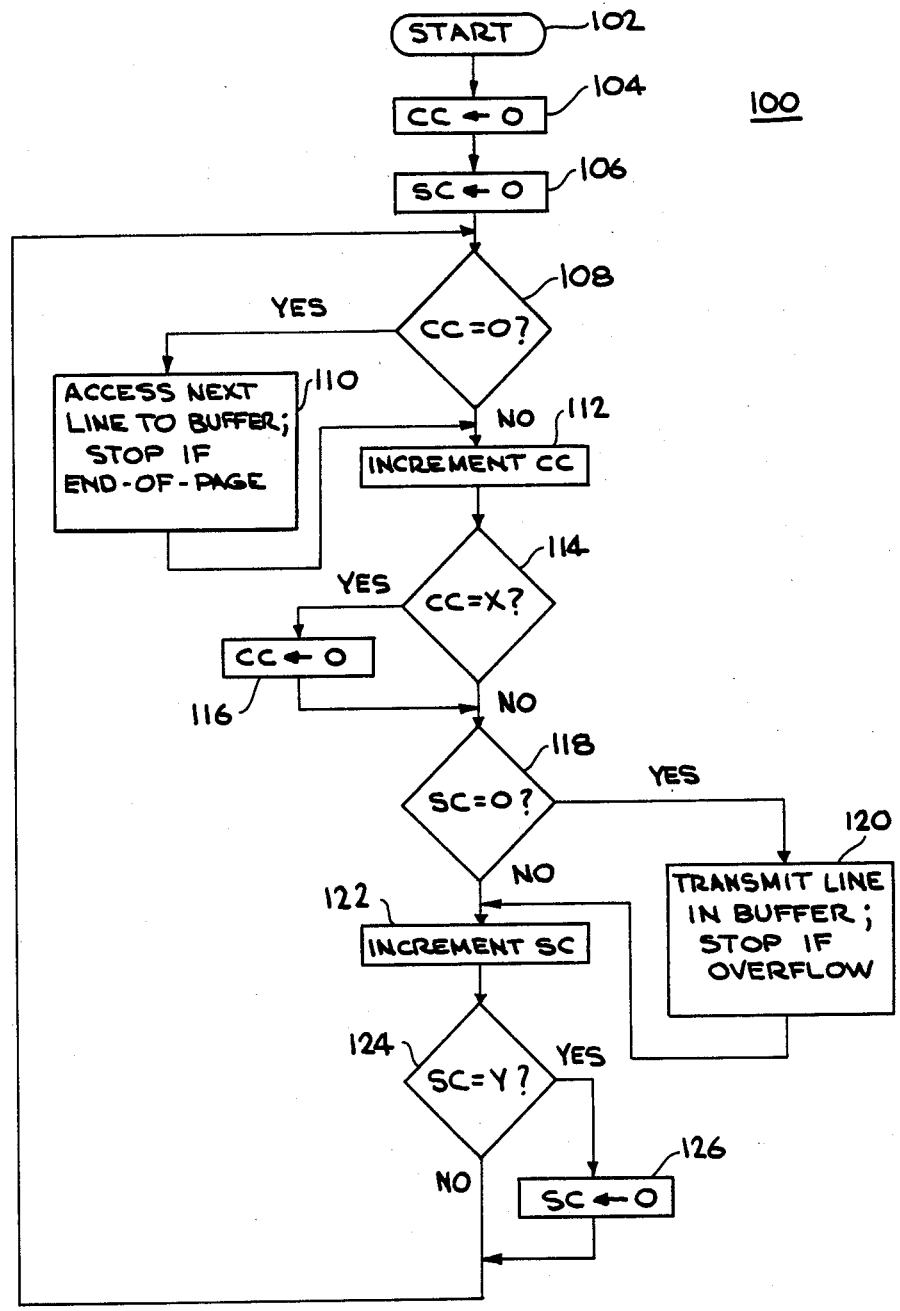
FIG. 3 is a flowchart of the resolution adaption method of the present invention.

A flowchart 100 is presented in FIG. 3 which details the resolution adaption method according to the present invention suitable for inclusion in a resolution adaption device 14 such as illustrated in FIG. 1. Immediately after the start of the algorithm, at block 102, initialization of a pair of variables, copy counter (CC) and skip counter (SC) to zero, is performed in blocks 104 and 106, respectively. Copy counter (CC) represents the number of times the input line has been replicated. Whenever CC equals zero as determined in decision diamond 108, a new input line is accessed from scanning device 12 and written into a line buffer as indicated in block 110. Block 110 calls for processing to cease if a special end-of-page character, indicating that all input lines of document 10 have been processed, is received by the line buffer. If CC is not equal to zero, the input line is to be used again for replication and the contents of the line buffer is accordingly not changed. In either event following exit from either block 108 or block 110, the copy counter (CC) is incremented in block 112 to reflect the replication of the input line one time.

Following incrementation of CC at block 112, the current contents of CC are tested in block 114 against the value x, being the numerator of the output/input resolution ratio described above. If CC is equal to x, the current input line has been replicated the requisite number $(x-1)$ times and CC is accordingly reset to zero in the block 116 leading from the "YES" exit from decision diamond 114.

A decision diamond 118 is entered from block 116 or from the "NO" exit from diamond 114 in which the contents of SC is tested against zero. Whenever the results of this test are true, a block 120 leading from the "YES" exit from diamond 118 is entered which calls for the contents of the line buffer to be transmitted to the output device, such as the facsimile terminal 16. Block 120 calls for processing to cease upon reception of an overflow signal, indicating that the number of lines used within the facsimile terminal-or other destination device-has been equalled.

After transmitting the line to the output device, or if SC were not zero and the "NO" exit from diamond 118 was taken, a block 122 is entered which increments the skip counter (SC) by one. Following incrementation of the SC, a decision diamond 124 is entered which compares the contents of SC against the value y, being the denominator of the ouput/input resolution ratio described above. If SC is equal to y, the current input line has been skipped the requisite number $(y-1)$ times and SC is accordingly reset to zero in the block 126 leading from the "YES" exit from decision diamond 124.

Following resetting of SC, or if SC were not equal to y and the "NO" exit from diamond 124 was taken, flow passes back to decision diamond 108 for the processing of the remaining input lines.

The resolution adaption method of the instant invention as illustrated in the flowchart 100 of FIG. 3 performs the requisite $(x-1)$ "expansions" and the requisite $(y-1)$ "compressions" without requiring storage of the complete intermediate sequence of lines illustrated in the middle column of FIG. 2. The method imposes only the minimal memory requirement that resolution adaption device 14 contain a line buffer. The resulting resolution adaption performed by device 14 operates rapidly in that the "expansion" and "compression" proceed simultaneously.

Figure 4:
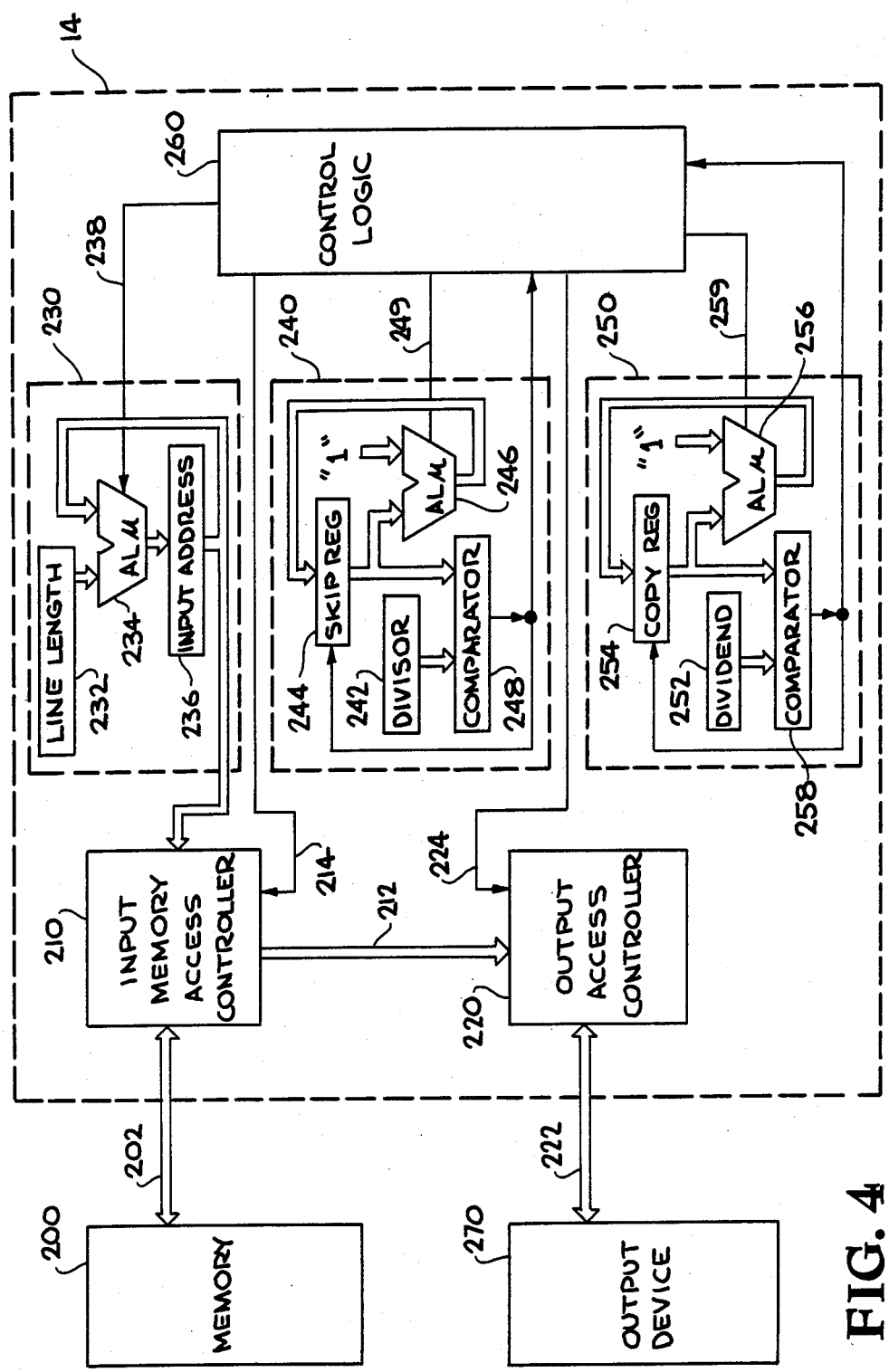
FIG. 4 is a functional block diagram of a resolution adaption device constructed according to the teachings of the present invention.

Illustration of a resolution adaption device 14 employing the method according to the teachings of the instant invention, reference should be had to FIG. 4. Resolution adaption device 14 is shown within the dashed border and comprises six major elements: an input memory access controller 210, an output access controller 220, an input memory address controller 230, a line skip controller 240, a line copy controller 250 and a control logic element 260. Document 10 line-scan bitmap information from the "input" device 12 having a given "input resolution" is stored in a memory 200 which is connected to the input memory access controller 210 via a bus 202. The resolution adaption device 14 will access the information stored in memory 200, tranmit and copy it to an "output" device 270 by skipping and generating document 10 scan-lines thereby producing a bit-map of the document 10 having a given "output resolution". The output device 270 may be another memory, a printer, a crt, a facsimile device, or any similar device capable of storing or processing bit-map information having the given "output resolution". The output device 270 is connected to the input memory access controller 210 via a bus 222 connecting the output access controller 220 to the output device; the output access controller 220, in turn, being connected via a bus 212 to the input memory access controller 210.

As shown in FIG. 4, control logic element 260 is connected to the input memory access controller 210 and the output access controller 220 via signal lines 214 and 224, respectively, so that the accessing and copying operations can proceed as will be described below in accordance with the resolution adaption method of the present invention.

While for purposes of explanation, all scan-lines within document 10 are to be stored in the memory 200 shown in FIG. 4, the method and device of the instant invention does not require such storage, and the scan-lines could equally well be received directly from input device 12 on a line-by-line basis and stored in a buffer imposing only a single scan-line storage requirement.

As will be described, the resolution adaption device 14 contains four registers which must have their contents initialized before the "input resolution" of document 10 is to be translated to the "output resolution". A scan-line length (LINE LENGTH) register 232 portion of input memory address controller 230 must be loaded with the number of contiguous memory locations required to store an input scan line within memory 200. An arithmetic-logic unit (ALU) 234 portion of input memory address controller 230 receives the contents of the LINE LENGTH register 232 at a first input. A second input of the ALU 234 receives the contents of an input memory address (INPUT ADDRESS) register 236. The INPUT ADDRESS register 236 is the second register which must be initialized before resolution adaption begins: namely, the address within memory 200 at which the first document 10 input scan line begins.

Under control of logic element 260, signals are conducted via a signal line 238 to ALU 234 which causes the ALU 234 to add the contents of LINE LENGTH register 232 to the current contents of INPUT ADDRESS register 236 following each access of memory 200 of an input scan line and for the subsequent storage of this sum into INPUT ADDRESS register 236 so that the starting address of the next input scan line within memory 200 is stored within input address register 236. The contents of the INPUT ADDRESS register 236 is conducted to the input memory access controller 210, and upon reception of a suitable signal generated by control logic element 260 and conducted to input memory access controller 210 via signal line 214, the next input scan line from memory 200 can be copied into the output access controller 220, as will be described hereinafter.

A third register which must be initialized is a DIVISOR register 242 portion of the line skip controller 240 which must be set to contain the divisor value "y" of the output/input resolution ratio, described in connection with FIG. 2, above. The fourth register which must be initialized before the resolution adaption process begins is a DIVIDEND register 252 portion of the line copy controller 250 which must be set to the dividend value "x" of the output/input resolution ratio.

Returning to the line skip controller 240, the contents of a resettable skip register (SKIP REG) 244 portion, which initially contains a zero value, is conducted to an input of an ALU 246 portion of the line skip controller 240 and to an input of a COMPARATOR 248 portion of the line skip controller 240. The COMPARATOR 248 also receives at a second input the contents of the DIVISOR register 242, "y". The ALU 246 receives at a second input a signal corresponding to the numerical value one and under control of logic element 260, signals are conducted via a signal line 249 to ALU 246 which causes the ALU 246 to add one to the contents of the SKIP REG 244. The resulting incremented value is conducted from the output of the ALU 246 to the SKIP REG 244 for storage therein.

The newly updated value within the SKIP REG 244 is compared within COMPARATOR 248 against the contents "y" of DIVISOR register 242. When these values become equal, a signal is generated by comparator 248 which is conducted to resettable SKIP REG 244 which causes the value therein to be reset to zero. This signal is also conducted to control logic element 260 which, in response, subsequently generates signals on lines 214 and 224 causing the input memory access controller 210 to use the line starting address received from the input memory address register 236 to access the current scan line from the memory 200 and to transfer this scan line via busses 202 and 212 to the output access controller 230. The latter controller 230, in turn, in response to the signal generated on signal line 224 control logic 260, transmits the current scan line to the output device 270 via bus 222. The line skip controller 240 accordingly implements that portion of the resolution adaption method of the present invention contained in the flowchart 100 of FIG. 3 corresponding to blocks 118, 120, 122, 124 and 126.

In a similar manner, the line copy controller 250 portion of FIG. 4 implements that portion of the resolution adaption method of the present invention contained in the flowchart 100 corresponding to blocks 108, 110, 112, 114 and 116. As mentioned above, line copy controller 250 includes a DIVIDEND register 252 portion which contains the dividend value "x" of the output/input resolution ratio. The contents of a resettable copy register (COPY REG) 254 portion, which initially contains a zero value, is conducted to an input of an ALU 256 portion of the line copy controller 250 and to an input of a COMPARATOR 258 portion of the line copy controller 250. The COMPARATOR 258 also receives at a second input the contents of the DIVIDEND register 252, "x". The ALU 256 receives at a second input a signal corresponding to the numerical value one and under control element 260, signals are conducted via a signal line 259 to ALU 256 which causes the ALU 256 to add one to the contents of the COPY REG 254. The resulting incremented value is conducted from the output of the ALU 256 to the COPY REG 254 for storage therein.

The newly updated value within the COPY REG 254 is compared within COMPARATOR 258 against the contents "x" of DIVIDEND register 252. When these values become equal, a signal is generated by COMPARATOR 258 which is conducted to resettable COPY REG 254 which causes the contents therein to be reset to zero. This signal is also conducted to control logic element 260 which, in response, generates signals on lines 214 and 224 causing the input memory access controller 210 to load the line starting address received from the input memory address register 236, to access the current scanline from the memory 200 and to transfer this scan line via busses 202 and 212 to the output access controller 220. The latter controller 230, in turn, in response to the signal generated on signal line 224 by control logic 260, transmits the current scan line to the output device 270 via bus 222.

The line copy controller 250 accordingly implements that portion of the resolution adaption method of the present invention contained in the flowchart 100 of FIG. 3 corresponding to blocks 108, 110, 112, 114 and 116.

The control logic 260 element of resolution adaption device 14 incorporates a programmable logic array (PLA) of a type well known to those skilled in the art. In conjunction with conventional signal-generation circuitry internal to control logic 260, and the PLA, control logic 260 sends pulses alternately to ALU 246 and to ALU 256 via signal lines 249 and 259, respectively, which cause the sequential processing of the lines of a document 10 as called for in blocks 112 and 122 as described above in connection with flowchart 100 of FIG. 3

In order to implement the blocks 110 and 120 of the flowchart 100 of FIG. 3, a signal is generated by control logic 260 element on signal line 238 which is received by ALU 234 causing the ALU 234 to add the contents of LINE LENGTH register 232 to the current contents of INPUT ADDRESS register 236 each time the signal generated by comparator 258 causing the COPY REG 254 to be reset to zero is also received by the control logic 260. In this manner, the decision diamond 108 of flowchart 100 is implemented and accessing of the next scan line called for in block 110 is implemented by the resolution adaption device 14 by control logic 260, in response to the receipt of the signal generated by COMPARATOR 258, generates on signal line 214 a signal which is received by the input memory access controller 210 which causes the next input scan line to be copied from memory 200 into the output access controller 220, as described above.

Similarly, block 120 of flowchart 100 is implemented when a signal is generated by control logic 260 element on signal line 224 which is received by output access controller 220 each time the signal generated by comparator 248 causing the SKIP REG 244 to be reset to zero is also received by the control logic 260. In this manner, the decision diamond 118 of flowchart 100 is implemented and transmitting the current line called for in block 120 is implemented by control logic 260 which, in response to the receipt of the signal generated by COMPARATOR 248, generates an signal line 224 a signal which is received by the output access controller 220 which causes the current scan line to be transmitted to the output device 270 via bus 222.

In addition to the connections explicity shown in FIG. 4, the control logic 260 element of resolution adaption device 14, is connected to the document scanning device 12 and the facsimile terminal 16, or similar device, to facilitate transmission of input and output scan lines, as will be appreciated by those skilled in the art.

In order to implement the "START" block 102 of flowchart 100, control logic 260 element initially generates signals on line 214 which causes the input memory access controller 210 to use the line starting address received from the INPUT ADDRESS register 236 to access one scan line from the memory 200 and to transfer this scan line via busses 202 and 212 to the ouput access controller 230. Control logic 260 then generates signals in line 224 which causes the output access controller 230 to transmit this first scan line to the output device 270 via bus 222. In addition, control logic 260 initializes the SKIP REG 244 and the COPY REG 254 to zero, as called for in blocks 106 and 104, respectively, of flowchart 100.

The processing of scan-lines from document 10 continues within resolution adaption device 14 according to the method of the present invention as illustrated in flowchart 100 until either a special end-of-page character, generated by the document scanning device 12, or an overflow signal, generated by the facsimile terminal 16, is received by the control logic 260 element of the device 14, which then reinitializes the SKIP REG 244 and the COPY REG 254 to zero, as called for in blocks 106 and 104, respectively, of flowchart 100.

I claim:

1. A method of adapting two-dimensional information represented as a first plurality of scan-lines along a first dimension having a first resolution scale along a second dimension so that said information is represented as a second plurality of scan-lines along said first dimension having a second resolution scale along said second dimension comprising the steps of:
   (a) representing said information as a third plurality of scan-lines along said first dimension wherein each said scan-line within said first plurality of scan-lines is replicated adjacently along said second dimension in direct proportion to said second resolution scale; and
   (b) representing said information as said second plurality of scan-lines, being ones in number directly proportional to said first resolution scale, and selected in a predetermined manner from said scan-lines within said third plurality of scan lines.

2. The resolution adaption method of claim 1 wherein a fractional ratio of said second resolution scale to said first resolution scale, expressed in lowest terms, is x/y, wherein step (a) further calls for each scan-line of said first plurality of scan-lines to be replicated $(x-1)$ times in said third plurality of scan-lines and, wherein step (b) further calls for selection of the first, $(y+1)$st, $(2y+1)$st, . . . , scan-lines within said third plurality of scan-lines.

3. A method of adapting two-dimensional information represented as a first plurality of horizontal scan-lines arranged in a first-to-last vertical order and having a first vertical resolution scale so that said two-dimensional information is represented as a plurality of horizontal scan-lines arranged in a first-to-last vertical order and having a second vertical resolution scale, comprising the steps of:
   (c) calculating the fractional ratio of said second vertical resolution scale to said first vertical resolution scale and reducing said fraction to lowest terms by removing the greatest common factor of both the dividend and the divisor thereof;
   (d) initializing a copy counter and a skip counter to zero and setting an input pointer to said first one of said first plurality of horizontal scan-lines ("current scan-line");
   (e) comparing a value of said copy counter with zero, and moving said input pointer to the next one of said first plurality of horizontal scan-lines;
   (f) incrementing said copy counter by one;
   (g) comparing the value of said copy counter with the dividend of said reduced fractional resolution ratio and resetting said copy counter to zero when said comparison indicates equality;
   (h) comparing the value of said skip counter with zero, and including in said second plurality of horizontal scan-lines said current scan-line from said first plurality of horizontal scan-lines when said comparison indicates equality;

(i) incrementing said skip counter by one;

(j) comparing the value of said skip counter with the divisor of said reduced fractional resolution ratio and resetting said skip counter to zero when said comparison indicates equality;

(k) returning to step (e).

4. Apparatus for transmitting two-dimensional information including source means for generating electrical signals representing a first plurality of scan-lines along a first dimension having a first resolution scale along a second dimension, destination means responsive to electrical signals representing a second plurality of scan-lines along said first dimension having a second resolution scale along said second dimension for generating electrical signals representative of said two-dimensional information, and resolution-adaption means selectably operable in one of a plurality of input resolution modes and in one of a plurality of output resolution modes, responsive to said electrical signals representing said information as said plurality of scan-lines having said first resolution scale, being said selected input resolution, for generating electrical signals representing said information as said second plurality of scan-lines having said second resolution scale, being said selected output resolution, said resolution-adaption means comprising:

control logic means for generating control and timing signals;

input means responsive to said electrical signals generated by said source means connected to said control logic means for sequentially selecting and for retrieving ones of said scan-lines from said first plurality of scan-lines in response to signals from said control logic means;

output means connected to said control logic means, to said input means, and to said destination means for generating electrical signals conducted to said destination means representative of one of said scan-lines from said first plurality of scan-lines;

skip counter means connected to said control logic means responsive to said selectable input resolution for storing, incrementing, and setting to zero a skip-count and for generating a signal conducted to said control logic means when said skip-count is equal to a value proportional to said second resolution scale, thereby causing said skip-count to be reset to zero and causing said control logic means to generate a control signal to be received by said input means to select the next scan-line in said sequence; and copy counter means connected to said control logic means responsive to said selectable output resolution for storing, incrementing and setting to zero a copy-count and for generating a signal conducted to said control logic means when said copy-count is equal to a value proportional to said first resolution scale, said proportionality factor being as for said skip-counter means, thereby causing said copy-count to be reset to zero and causing said control logic means to generate control signals to be received by said input means and by said output means causing said input means to access said currently-selected scan-line and causing said output means to generate signals conducted to said destination means representative of one of said scan-lines from said first plurality of scan-lines.

5. Transmission apparatus according to claim 4 wherein said proportionality factor in said skip counter means and in said copy counter means if said resolution-adaption means is the fractional ratio of said second resolution scale, being said selected output resolution, to said first resolution scale being said selected input resolution.

6. Transmission apparatus according to claim 5 wherein said fractional ratio, expressed in lowest terms, is x/y, wherein said skip counter means includes a user-accessible divisor register means for storing said value y, resettable skip-count register means for storing and setting to zero said skip-count, comparator means connected to said divisor register means and to an output terminal of said skip-count register means for comparing for equality the contents of said skip-count register means and said divisor register means and for generating an equality signal upon detection of said equality, said equality signal conducted to a reset terminal of said skip-count and to said control logic register means and incrementor means responsive to a timing signal generated by said control logic means having an input terminal connected to said output terminal of said skip-count register means and having an output terminal connected to an input terminal of said skip-count register, for generating a signal causing the contents of said skip-count register means to be increased by one upon reception of a clock signal from said control logic means unless said comparator means generates said equality signal thereby causing the contents of said skip-count register means to be reset to zero, and wherein said copy counter means includes a user-accessible dividend register means for storing said value x, a resettable copy-count register means for storing and setting to zero said copy-count, comparator means connected to said dividend register means and to an output terminal of said copy-count register means for comparing for equality the contents of said copy-count register means and said dividend register means and for generating an equality signal upon detection of said equality, said equality signal conducted to a reset terminal of said copy-count register means and to said control logic means and incrementer means responsive to a timing signal generated by said control logic means, said incrementer means having an input terminal connected to said output terminal of said copy-count register means and having an output terminal connected to an input terminal of said copy-count register, for generating a signal causing the contents of said copy count register means to be increased by one upon reception of a clock signal from said control logic means unless said comparator means generates said equality signal thereby causing the contents of said copy count register means to be reset to zero.

* * * * *